United States Patent [19]

Achtsnit

[11] Patent Number: 5,567,516
[45] Date of Patent: Oct. 22, 1996

[54] TEXTILE SILICA SLIVER, ITS MANUFACTURE AND USE

[76] Inventor: Hans-Dieter Achtsnit, Am Sonnenberg 17, D-63820 Elsenfeld-Eichelsbach, Germany

[21] Appl. No.: 433,435
[22] PCT Filed: Sep. 15, 1993
[86] PCT No.: PCT/DE93/00862
§ 371 Date: May 10, 1995
§ 102(e) Date: May 10, 1995
[87] PCT Pub. No.: WO94/12441
PCT Pub. Date: Jun. 9, 1994

[30] Foreign Application Priority Data

Dec. 1, 1992 [DE] Germany .................. 42 40 354.5

[51] Int. Cl.[6] ............................................. D02G 3/00
[52] U.S. Cl. .................. 428/357; 428/359; 428/379; 19/236; 264/204; 501/4; 501/95
[58] Field of Search .................. 428/379, 357, 428/359; 501/4, 95, 133; 19/236; 264/204

[56] References Cited

U.S. PATENT DOCUMENTS

| | | | |
|---|---|---|---|
| 3,996,145 | 12/1976 | Hepburn | 428/379 |
| 4,018,616 | 4/1977 | Sugahara et al. | 106/74 |
| 4,080,915 | 3/1978 | Bompard et al. | 112/412 |
| 4,786,017 | 11/1988 | Wegerhoff et al. | 501/4 |

*Primary Examiner*—Newton Edwards
*Attorney, Agent, or Firm*—Pollock, Vande Sande & Priddy

[57] ABSTRACT

The textile silica sliver is produced by a continuous process of the dry spinning of sodium silicate filament yarn, direct formation of sodium silicate silver by the drum drawing process, transformation to textile silica sliver in a post-treatment line, and direct winding on of the sliver. The various textile products manufactured from textile silica slivers or staple fiber yarns made therefrom are suitable for application in insulation and heat protection up to 1100° C., substitute for asbestos and improve energy efficiency.

11 Claims, 1 Drawing Sheet

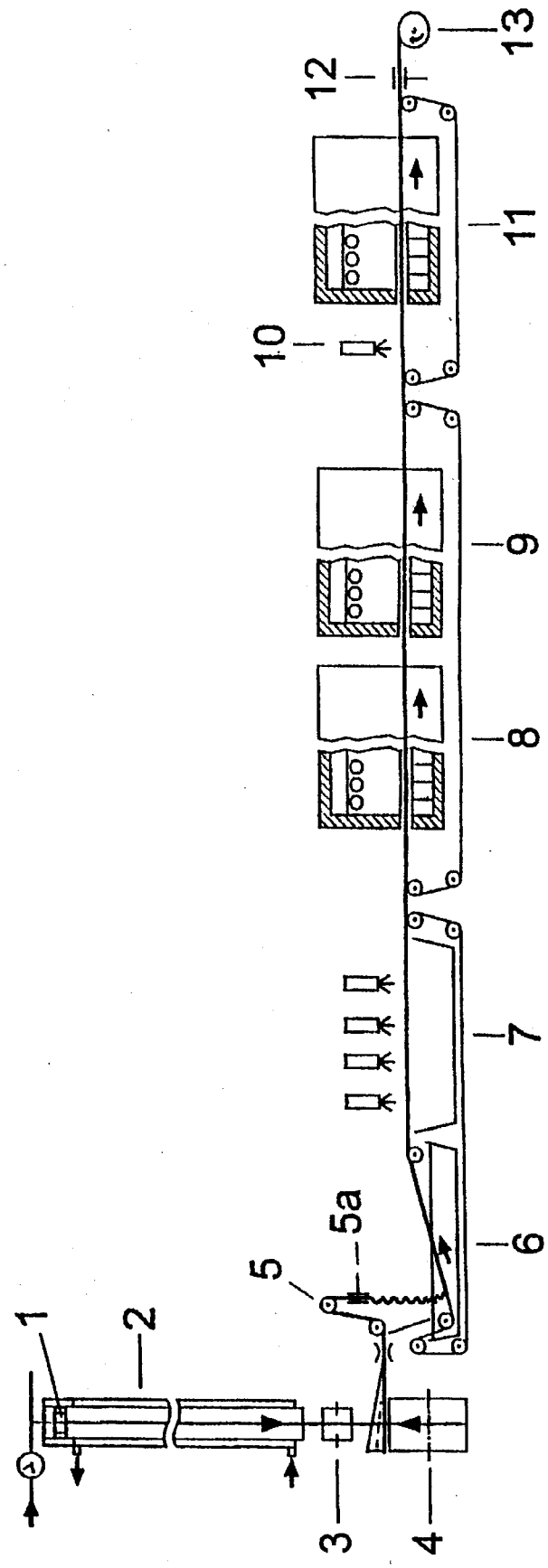

TEXTILE SILICA SLIVER, ITS MANUFACTURE AND USE

FIELD OF THE INVENTION

The invention relates to textile silica sliver, its manufacture, as well as the use of the silica sliver.

BACKGROUND OFF THE INVENTION

Textile products made from textile quartz, leached silica and silica fibers have been known in some cases for a long time. They are made according to different processes and consist of pure or nearly pure silicon dioxide (Ullmanns Enzyklopädie der technischen Chemie, 4th Edition (1977) Vol. II, pp. 359–374, Verlag Chemie, Weinheim/Bergstr. and Melliand Textilber. (1989), pp. 629–632).

Depending on processing conditions and on the single fiber length, the following primary fiber types can be distinguished according to Koch P. A.: Faserstofftabellen, Textilglasfasem (Z.ges.Textilind. 69 (1967), pp. 839–846):

filament (elementary fiber), a practically continuous fiber with defined diameter of the single fiber staple fiber, non continuous fiber with defined diameter of the single fiber.

Linear products made of textile fibers include among others the following:

sliver, consisting of a continuous assembly of slightly bonded staple fibers in a practically parallel arrangement (not or nearly not twisted staple fibers). The sliver has a defined linear density and is the source material of staple fiber yarns and plied yarns.

Textile fibers are processed to linear products such as, e.g., yarns and to areal products such as, e.g., fabrics or braidings; they can be used too for reinforcement of a matrix, e.g., of synthetics for the manufacture of composites.

The so-called quartz glass fibers and filament yarns which have established themselves on the market are manufactured by the rod spinning process formed from a quartz melt at temperatures greater than 2000° C. Considerable technical resources are required, which means that the prices for the corresponding products are relatively high.

It is also possible to leach glass filament yarn and the textile products manufactured therefrom with acids (DE-OS 2 609 419, GP-PS 2094 363). Leached silica products manufactured by this method are used up to 1100° C. As, however, their mechanical properties are very weak, in the case of textiles heavy fabrics around 600–1300 g/m² are mainly used. It has not been possible to establish a broad field of application in textile processing of the respective yarns because of these weak mechanical properties.

It has, however, been possible to manufacture silica fibers with excellent properties by a new production method under advantageous conditions, (DE-PS 2 900 990 and DE-PS 2 900 991). A sodium silicate filament yarn with a drawing off speed of at least 30 m/min (in an example at least 350 m/min) is manufactured in a first processing step from sodium silicate solutions by the dry spinning process. This product, which tends to hydrolyze, is transformed to silica fibers by treatment with acid and/or salt solutions containing hydrogen ions at a retention time of 1 to 15 minutes.

DE-PS 2 900 991 does not give details as to the conditions under which the sodium silicate fibers are fed immediately from the dry spinning unit into the treatment bath: due to the different processing speeds and retention times this is not easily understandable from a technical point of view. In the examples quoted in the DE-PS 2 900 991 also, reference is made to the transformation of "yarn pieces of 1 m length" and Patent claims 6 to 9 clearly refer to the product type "fiber" in the sense of staple fiber or fiber short cut. For chemico-physical reasons textile products made of quartz, leached silica and silica fibers can be used up to ca. 1100° C. The DE-PS 2 900 991 quoted does not however report on this.

Since about 1943 textile glass silver has been manufactured in a one stage process by the drum drawing process (DE-PS 715 884, GB-PS 755 626, DE-AS 1 199 935, DE-AS 1 270 748). Glass is melted at 1250° to 1300° C. and drawn by a rotating drum from a bushing at a speed of $V_1$ up to approx. 50 m/sec. The adjoining continuous glass filaments are scraped off the drum with the additional aid of a flow of air prior to complete rotation on the drum. Over the width of the drum there is a cone-shaped collecting channel; the sliver formed here is pulled out of the pointed end of the collecting channel and wound at a, compared to $V_1$, low speed of $V_2$ up to 10 m/sec: "drum drawing process". The linear density (tex) of the sliver can be adjusted among others by the ratio $V_1 : V_2$.

Prior to the drawing drum maximum 1% textile size is applied to the continuous glass filaments to give among other the textile glass sliver an appropriate drawing force through adhesion. The textile glass sliver produced in this way consists of fibers with a staple length of approx. 50–1000 mm. After twisting, glass staple fiber yarns with a linear density in the range of 125 text to 2000 tex are usually obtained.

Inexpensive textile products made from these glass staple fiber yarns are used, as a substitute for asbestos, for example as sealings or as thermal insulation material at a continuous application temperature up to approx. 300° C. For chemico-physical reasons, products made from glass staple fiber yarns are not suitable for applications above a temperature range of 400°–500° C.

Textile products made from ceramic fiber yarns are used at temperatures above 400°–500° C. (in some cases as a substitute for asbestos). Ceramic fiber yarns are made from, among other raw materials, ceramic fibers of various lengths on well known production units (slivers manufactured on carding machines, and yarns manufactured on ring spinning frames). Apart from technical limitations in processing and application, ceramic fibers, similar to asbestos fibers, are also suspected of causing cancer, due to the fact that their size—some fibers are less than 3 μm in diameter—permits them to enter the lungs easily (Hodgson, A. A., "Alternatives to Asbestos, The Pros and Cons", Critical Reports on Applied Chemistry, Vol. 26, John Wiley & Sons, Chichester, N.Y., 1989).

U.S. Pat. No. 3,760,049 describes a process for continuously manufacturing high temperature resistant oxide filament yarns (continuous fibers, e.g., $3Al_2O_3 : 1B_2O_3 : 3SiO_2$). Green fibers manufactured by the dry spinning process ($V_1$=40–60 m/min) are transported relaxed as loops on a conveyor belt through the furnaces ($V_2$=approx. 0.4 m/rain).

Organic constituents, which enable the extrusion through spinnerettes, are removed by thermal decomposition at temperatures up to approx. 1200° C. and the crystalline structure, which determines the strength, is formed.

It is well known that this type of yarn can be used up to 1200° C. and above. The high raw material and processing costs are responsible for the high selling price. The application in high temperature technology is therefore limited. Staple fiber yarns are not known.

Thus there is an urgent need for economical and health compatible inorganic textile slivers and staple fiber yarns which can be processed to a wide range of textile products and which can be used at temperatures above 400°–500° C. while maintaining, at the same time, their good mechanical properties.

SUMMARY OF THE INVENTION

The object of the invention is a method for the production of textile silica slivers with good mechanical properties, taking into account and supplementing DE-PS 2 900 991 with regard to dry spun sodium silicate filament yarn and its treatment in acid solutions and/or salt solutions containing hydrogen ions.

The invention involves the combination of the dry spinning of sodium silicate filament yarn followed by the continuous formation of sodium silicate sliver by the drum drawing process and direct transportation into the post treatment line.

The sodium silicate filament yarn freshly extruded through the spinnerettes is drawn by the rotating drum after passing through the drying chimney and being lubricated with textile size. In deciding on the composition of the size, care should be taken that it is soluble in the acid bath which follows so as not to hinder the reaction of the sodium silicate filaments. The aqueous solution (preparation) given in DE-PS 2 900 991 can be used as sizing agent.

The minimum spinning speed is 350 m/min. However, spinning speeds $V_1$ of more than 600 m/min and less than 1200 m/min have proved to be advantageous. Too low and too high speeds cause malfunctions in the spinning process, which make industrial production inefficient.

It is furthermore important that retaining the sodium silicate filaments on the drum for a short period has proved advantageous. Thus, atmospheric moisture or carbon dioxide which, as is well known, react physically and chemically with sodium silicate, do not harm the filaments.

Prior to complete rotation on the drum—as described above—the filaments are scraped off, intermingled in a chamber and drawn off laterally via a twisting head at a speed $V_2$ lower than the spinning speed $V_1$. The linear density of the sodium silicate sliver can be influenced by the ratio of the yarn speeds $V_1: V_2$.

In the case that the sodium silicate sliver enters the post treatment line at a speed below 200 m/rain, there will be no malfunctions. This gives an advantageous ratio of the speeds $V_1: V_2$ of between 5 and 10. The transportation of the sliver from the drawing drum into the post treatment line can also be supported by an air injector.

It was unexpectedly found that the open character of the sodium silicate sliver has a positive effect on the speed of the chemical reaction in the aqueous acid or salt solution containing hydrogen ions; the retention time could be reduced to less than one minute; 20–30 secs. were found to be sufficient. The short retention time has a beneficial effect on the processing conditions, the plant size and, consequently on the manufacturing costs.

The textile silica sliver formed in the hydrogen ion bearing acid or salt solution is deposited in zigzags on conveyor belts and transported through the individual zones of the post treatment line.

After the calcinating furnace, the sliver must be treated with approximately 1% textile size to protect the fiber surface against abrasion and to improve the adhesion of the filaments to one another in respect to winding up on the bobbins and to textile processing. A 10% aqueous solution (preparation) of a surfactant salt of ammonia(G 3634 of Atlas Chemie Co.). can be used as sizing agent.

The intermingling of the textile silica sliver in air jets is possible in principle. It is recommended that this procedure be carried out gently to avoid breakage of the individual silica filaments and/or staple fibers. Apart from the intermingling of the pure silica sliver, mixed yarns with interesting properties for the later application can be manufactured: filaments or yarns with supplementary properties can be added, for example before the air jet, and intermingled with the textile silica sliver in the air jet.

Depending on the number of holes in the spinnerette, the throughput of the spinning solution to be extruded, the spinning speed and the ratio $V_1: V_2$, a broad range of sliver linear densities can be manufactured. Customer wishes and accepted standards usually determine the linear density of the yarn. The most common ones are likely to be linear densities of around 125 tex and 330 tex.

Textile silica slivers and silica staple fiber yarns made therefrom are processed to, e.g., yarns, cords, braidings and fabrics. These textile products are used among others for insulation and heat protection purposes at temperatures above 400°–500° C., particularly up to 1100° C.

BRIEF DESCRIPTION OF THE DRAWING

The accompanying drawing shows the main features of the process of the invention.

DETAILED DESCRIPTION

The water content of the sodium silicate filaments coming from a spinnerette 1 is reduced to a value of approximately 15–30% by weight in a drying chimney 2 by air in a direct flow or rising in a counterflow. Thereafter textile size is applied, for example, by a kiss roll 3. Then the filament yarn is taken up by a drawing drum and scraped off prior to complete rotation on the drum 4, intermingled in a conical chamber and drawn off laterally. By means of a transportation godet 5 and a zigzag transporting device, possibly also supported by an injector nozzle 5a, the sodium silicate sliver formed is transported to the entrance of an acid bath (which is the entrance to the post-treatment line). The transformation takes place in the acid bath 6, after which the formed textile silica sliver is washed at station 7. Thereafter the sliver falls from an acid-resistant conveyor belt onto a heat-resistant conveyor belt and is transported through a drying zone 8 and calcinating zone 9. The textile size is then applied at station 10 and dried at station 11. Before winding onto the bobbins 13, the sliver can be intermingled in an air jet 12 and, if necessary, a yarn with additional properties can be added.

The invention is explained in more detail by the following examples, which should not be construed as limiting the scope of the invention. In the examples, the conditions in accordance with DE 2 900 991 with regard to the formation of the sodium silicate spinning solution the sodium silicate filame and the post-treatment conditions are taken into account. The frictional properties of the single staple fibers are influenced by the stick-slip behavior of the textile silica sliver, which has an influence on further processing. The stick-slip behavior can be characterized by the maximum drawing force which is determined, with the help of a tensile testing machine, by recording in a diagram the rate of elongation as a function of the load applied. The peak of the curve shown in the diagram represents the maximum drawing force.

EXAMPLE 1

Sodium silicate with a molecular ratio $Na_2O/SiO_2 = 1/2.48$ and a viscosity of 240 Pa.s (30° C.) is extruded to sodium silicate filament yarn through two spinnerettes, each with 120 holes. The spinning speed was set at 750 m/min by the drawing drum. A ratio $V_1:V_2$ of 8 was set by the speed of the following godets so that the silver formed was fed zigzag to the post-treatment line at approximately 94 m/min. The speed of the conveyor belts which transport the sliver through the zones of the post-treatment line was 10 m/min. Drying was done at approximately 150° C., calcinating was done at approximately 800° C.

The following data were measured on the sized textile silica sliver and on single fibers:

| | |
|---|---|
| linear density of the sliver | 275 tex |
| breaking tenacity (single filament) | 37 cN/tex |
| maximum drawing force (sliver) | 5–6N |
| breaking tenacity (staple fiber yarn, twisted) | approximately 11 cN/tex |

EXAMPLE 2

Spinning conditions as in Example 1.

The sodium silicate sliver was formed at a ratio $V_1:V_2$ of 4. At the high sodium silicate sliver speed of approximately 190 m/min., it was not possible to post treat and wind the textile silica sliver onto bobbins without faults occurring. The data summarized in the following table were determined on short lengths of yarn:

| | |
|---|---|
| linear density of the sliver | approximately 134 tex |
| filament diameter | 9.2 μm |
| breaking tenacity (filament) | 40 cN/tex |
| maximum drawing force (sliver) | 4–5N |
| breaking tenacity (staple fiber yarn, twisted) | approximately 12 cN/tex |

EXAMPLE 3

Sodium silicate filament yarn was drawn off from a spinnerette with 120 holes at a speed of 1000 m/min. The sliver was formed at a ratio $V_1:V_2$ of 8. The following table shows the results of the textile silica sliver:

| | |
|---|---|
| linear density of the sliver | 135 tex |
| filmament diameter | 9.1 μm |
| breaking tenacity (filament) | 38 cN/tex |
| maximum drawing force (sliver) | 5–6N |
| breaking tenacity (staple fiber yarn, twisted) | approximately 10 cN/tex |

What is claimed is:

1. A textile silica sliver consisting of silica staple fibers 50–1000 mm long, the single fibers having a breaking tenacity of 20–50 cN/tex and the textile silica sliver having, at a linear density of 50–2000 tex according to type, a maximum drawing force of 2 to 20N.

2. A process for manufacturing textile silica slivers, in which a sodium silicate filament yarn is manufactured from a manufactured sodium silicate solution by a dry spinning process which, immediately downstream of a drying chimney, is drawn off by a rotating drawing drum with a speed $V_1$ of at least 350 m/min and is directly transformed to a sodium silicate sliver at a ratio $V_1:V_2$ greater than 1 and this sodium silicate sliver is transported directly into an entrance of a downstream post-treatment line with a speed $V_2$ lower than speed $V_1$, and is continuously transformed in an acid bath into textile silica slivers and is, as such, supplied with a standard textile size, wound onto bobbins.

3. The process according to claim 2, wherein the spinning speed $V_1$ is 600 to 1200 m/min.

4. The process according to claim 2 or 3, wherein, upstream of said drawing drum the sodium silicate filament yarn is lubricated with textile size, easily soluble in the succeeding acid bath.

5. The process according to claim 2 or 3, wherein the sodium silicate sliver is transported directly and continuously from said drawing drum while forming zigzags to said entrance of said post-treatment line at a speed $V_2$ of less than 200 m/min.

6. The process according to claim 2 or 3, wherein the drawing ratio $V_1:V_2$ is 5 to 10.

7. The process according to claim 2 or 3, wherein the transport of sodium silicate sliver from said drawing drum to said entrance of said post-treatment line is supported by one of a transport godet and a flow air from an air injector nozzle.

8. The process according to claim 2 or 3, wherein the textile sodium silicate sliver is transformed continuously into textile silica sliver in said acid bath of said post-treatment line and is then washed, dried and calcinated.

9. A silica staple fiber yarn manufactured from textile silica sliver according to claim 1.

10. Twisted yarns, cords, braidings and fabrics manufactured from textile silica sliver according to claim 1.

11. Method of use of twisted yarns, cords, braidings and fabrics according to claim 10 at temperatures higher than 400° to 500°.

\* \* \* \* \*